United States Patent
Mitchell et al.

(10) Patent No.: US 7,366,161 B2
(45) Date of Patent: Apr. 29, 2008

(54) FULL DUPLEX VOICE PATH CAPTURE BUFFER WITH TIME STAMP

(75) Inventors: Bruce E. Mitchell, Madison, AL (US); Christopher A. Otto, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 1069 days.

(21) Appl. No.: 10/337,101

(22) Filed: Jan. 6, 2003

(65) Prior Publication Data

US 2003/0174694 A1 Sep. 18, 2003

Related U.S. Application Data

(63) Continuation-in-part of application No. 10/095,375, filed on Mar. 12, 2002, now Pat. No. 7,142,533.

(51) Int. Cl.
*H04L 12/66* (2006.01)
*H04B 1/56* (2006.01)
*H04B 3/20* (2006.01)
*H04J 3/00* (2006.01)

(52) U.S. Cl. .................. 370/352; 370/276; 370/280; 370/286; 370/289

(58) Field of Classification Search ........ 370/241–242, 370/248, 252, 280, 286, 294, 295, 352–356, 370/276, 289; 379/406.01, 406.05, 406.08
See application file for complete search history.

(56) References Cited

U.S. PATENT DOCUMENTS

| | | | | |
|---|---|---|---|---|
| 4,550,425 A | * | 10/1985 | Andersen et al. | 704/212 |
| 5,541,919 A | * | 7/1996 | Yong et al. | 370/416 |
| 5,592,473 A | * | 1/1997 | Matern et al. | 370/264 |
| 5,597,473 A | * | 1/1997 | Hambitzer et al. | 205/780.5 |
| 5,629,740 A | * | 5/1997 | Tanaka et al. | 348/515 |
| 5,703,479 A | * | 12/1997 | Wieczorek et al. | 324/73.1 |
| 2002/0151324 A1 | * | 10/2002 | Tatsumi | 455/550 |
| 2003/0002609 A1 | * | 1/2003 | Faller et al. | 375/372 |
| 2003/0185176 A1 | * | 10/2003 | Lusky et al. | 370/335 |
| 2004/0041946 A1 | * | 3/2004 | Gries et al. | 348/515 |

* cited by examiner

Primary Examiner—Binh K. Tieu
(74) Attorney, Agent, or Firm—Allen, Dyer, Doppelt, Milbrath & Gilchrist, P.A.

(57) ABSTRACT

For diagnostic and trouble-shooting purposes, an audio/voice signal capture mechanism is adapted to be interfaced with a time division multiplexed (TDM) transport path-cascaded echo canceler and compression arrangement for an integrated access device (IAD). The audio/voice signal capture mechanism captures a 'snapshot' of the audio/voice signals by storing a prescribed number of seconds of audio/voice path signals transmitted in both directions through the IAD, and time stamping the captured audio/voice signals and associated signaling events of interest. In this way, the invention operates as a 'virtual' oscilloscope, as it is able to capture pertinent data for any voice call problem along with an associated time stamp event log.

3 Claims, 1 Drawing Sheet

FULL DUPLEX VOICE PATH CAPTURE BUFFER WITH TIME STAMP

CROSS-REFERENCE TO RELATED APPLICATION

The present application is a continuation-in-part of U.S. application Ser. No. 10/095,375, filed Mar. 12, 2002, now U.S. Pat. No. 7,142,533, by A. Ghobrial et al, entitled: "Echo Canceler and Compression Operators Cascaded in Time Division Multiplex Voice Communication Path of Integrated Access Device for Decreasing Latency and Processor Overhead" (hereinafter referred to as the '375 application), assigned to the assignee of the present application and the disclosure of which is incorporated herein.

FIELD OF THE INVENTION

The present invention relates in general to communication systems and subsystems therefor, and is particularly directed to an audio/voice signal capture mechanism, that is adapted to be interfaced with a time division multiplexed (TDM) transport path-cascaded echo canceler and compression arrangement for an integrated access device (IAD). This audio/voice signal capture mechanism is operative to store prescribed segments of audio/voice path signals transmitted in both directions through the IAD, and to time stamp the captured audio/voice signals and associated signaling events of interest, so as to provide a 'snapshot' of audio/voice signals and thereby facilitate analysis (e.g., trouble-shooting) of the operation of the system.

BACKGROUND OF THE INVENTION

The ability to conduct high-speed data communications between relatively remote data processing systems and associated subsystems is currently a principal requirement of a variety of industries and applications, such as business, educational, medical, financial and personal computer users. Moreover, it can be expected that present and future applications of such communications will continue to engender more such systems and services. One technology that has attracted particular interest in the telecommunication community is digital subscriber line (DSL) service. DSL technology enables a public switched telephone network (PSTN) to use existing telephone copper wiring infrastructure to deliver a relatively high data bandwidth digital communication service, that is selected in accordance with expected data transmission rate, the type and length of data transport medium, and schemes for encoding and decoding data.

A reduced complexity diagram of the architecture of such a DSL system is shown in FIG. 1 as having mutually compatible digital communication transceivers 1 and 3 respectively installed at remotely separated 'west' and 'east' sites 2 and 4, and coupled to a communication link 10, such as a twisted pair of an existing copper plant. One of these transceivers, the west site transceiver 1, for example, may reside within a digital subscriber line access multiplexer (DSLAM) 6 of a network controller site (such as a telephone company central office (CO)).

The DSLAM 6 is coupled with an associated network backbone 5 providing access to various information sources 7 and the Internet 8. As such, west site transceiver 1 is used for transport of digital communication signals, such as asynchronous transfer mode (ATM)-based packetized voice and data, from the west central office site 2 over the communication link 10 to an integrated access device (IAD), which serves as the DSL transceiver 3 at the east end of the link, and is typically coupled with a computer 9 at a customer premises, such as a home or office. The IAD consolidates digitized data, voice and video traffic over a common wide area network (WAN) DSL link. The digitized voice stream may be digitally encoded as mu-law or a-law voice samples, as may be supplied by an industry standard ITU G.711 codec, or it may comprise digitally encoded voice samples from an integrated services digital network (ISDN) phone.

When digitally encoded voice samples are encapsulated in accordance with packet or cell protocol for network transport (for example, using voice over asynchronous transfer mode (ATM) or voice over internet protocol (IP)), it is often desirable that the IAD incorporate both echo cancellation and compression processing, for the purpose of both optimizing signal quality and maximizing the bandwidth available for non-voice signaling. Commonly employed industry standard signal processing operators include ITU G.168 echo cancellation and ITU G.726 adaptive differential pulse code modulation (ADPCM) compression.

Pursuant to the invention described in the above-referenced '375 application, these signal processing operators are implemented in a cascaded architecture diagrammatically illustrated in FIG. 2. As shown therein, an array of codecs 30 that are coupled to associated POTS phones 32 output respective digitally encoded voice signals as part of a time division multiplexed stream over a serial communication link 34.

Rather than terminate the serial communication link 34 at a DSP array as has been conventional practice, the architecture of FIG. 2 cascades respective echo cancellation and compression engines 40 and 50 within the TDM transport path 34, and then outputs the processed voice sample data produced by the cascaded signal processing operators in TDM format for application to a communication co-processor 35 within (or attached to) a downstream host processor 36. The processor assembles the incoming voice sample data into packets in accordance with encapsulating protocol, and outputs the packetized voice signal stream over a digital communication link to a destination receiver device.

For ATM-based voice over data transmissions, as a non-limiting example, the processed voice sample data may be encapsulated using respective algorithms to produce an AAL2 header and an ATM header. A control bus 39 is coupled between host processor 35 and the signal processing engines for supervisory control communications, and establishing operational parameters, as in a conventional communication signal processing application. However, it is not used for data transport.

The processed voice sample data received by the communication co-processor 35 from the TDM link 34 may be encapsulated using a direct memory access (DMA)-based packet generation mechanism of the type described in U.S. patent application Ser. No. 10/095,380, filed Mar. 12, 2002, by P. Herron et al, entitled: "Mechanism for Utilizing Voice Path DMA in Packetized Voice Communication System to Decrease Latency and Processor Overhead," assigned to the assignee of the present application and the disclosure of which is incorporated herein.

The respective echo cancellation and compression engines 40 and 50 are interfaced with the TDM bus 34 on their input (upstream) and output (downstream) ends by way of two full TDM ports. These ports may be configured as serial-to-parallel and parallel-to-serial conversion and associated signal encoding format (e.g., mu-law) circuits of the type conventionally employed in the art for the purpose.

This allows each of the echo cancellation and compression operators to operate directly on the data transported by any channel of the TDM voice sample signal stream, and produces processed digitized voice signal data that is then placed back in the same channel of the TDM stream for transport directly to the communication co-processor 35. This avoids burdening the host processor 36 with the substantial data interfacing exercise of having to use data bus cycles to extract the data, as in a conventional DSP array-based architecture.

Now although the cascaded echo canceler and compression operator arrangement described in the '375 application performs its function as intended on the incoming TDM signal streams, it has been found that operational anomalies may occur, depending upon the equipment with which the system is interfaced. As a non-limiting example, it has been found that, in some instances, as a result of an inadvertent false operation by the echo canceler, a user who has gone off-hook and received dial tone from the network switch may be unable to break the dial tone signal by sending a DTMF tone back toward the switch. It is desirable, when an anomaly such as but not limited to this situation arises, that it be possible to debug the problem without having to send a technician to the customer site.

SUMMARY OF THE INVENTION

In accordance with the present invention, this objective is readily achieved by a voice 'snapshot' augmentation of the communications control software in the IAD's communication controller. As will be described this voice snapshot mechanism comprises an audio/voice signal capture and time stamp operation that is readily interfaced with the TDM transport path-cascaded echo canceler and compression arrangement described in the above-referenced '375 application.

Pursuant to the invention, the communications control processor, in addition to assembling processed voice sample data into packets in accordance with an encapsulating protocol, and then forwarding the packetized voice signal stream to a destination receiver device, is operative, in response to a voice capture command, to store a prescribed quantity (some prespecified number (N) of seconds) of voice traffic in each of the two (upstream and downstream) transmission directions through the TDM path for a particular specified TDM channel number. The amount of voice traffic that may be stored is associated with the amount of associated random access memory available to the processor, and may comprise on the order of thirty seconds of voice signals.

The memory may be partitioned into respective storage sections associated with various types of captured information, such as, but not limited to time base information, downstream voice traffic, upstream voice traffic, echo canceler disabler tone, voice activity detection, and ADPCM rate change. Storage of time stamp data allows the data to be assembled and read out as a time domain waveform for evaluation by a system trouble-shooting operator.

Once a respective data capture buffer has been written with a prescribed amount of data, the captured data and its associated time stamp may be transferred to a separate signal processing operator, such as personal computer or network workstation and the like, for subsequent analysis. As a non-limiting example, the captured data may be transferred in binary form via an xmodem or tftp to the waveform analyzer.

With the audio/voice representative data downloaded to the waveform analysis station, it may then be converted to the appropriate format (e.g., ADPCM conversion, time stamp correlation to voice data, etc.) of an associated signal processing tool, such as a graphical waveform editor. Once it has been input to the graphical waveform editor, the data can be reproduced, for example, as by playing it out via an audio speaker, or coupled to a signal analysis application program, such as a time or frequency domain waveform analyzer. In this way, the invention operates as a 'virtual' oscilloscope, as it is able to capture pertinent data for any voice call problem along with an associated time stamp event log. This allows the user to effectively replay and analyze the captured signals of interest off line, and thus obviates the need to dispatch service personnel to the integrated access device at the remote site.

DETAILED DESCRIPTION

Figure 1:
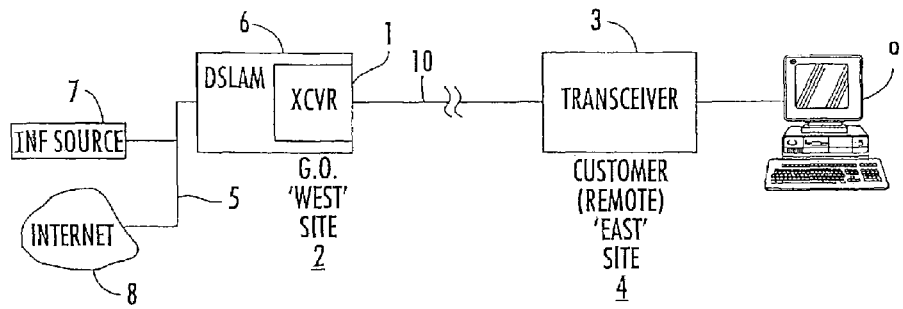
FIG. 1 is a reduced complexity diagram of the general architecture of a DSL telecommunication system.
Figure 2:
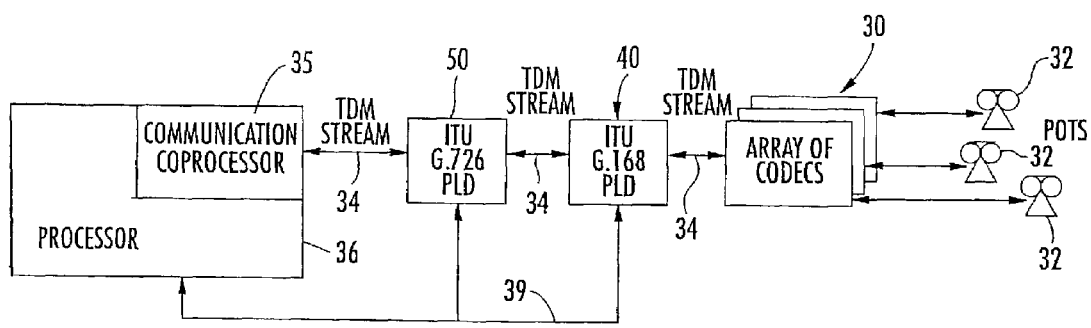
FIG. 2 diagrammatically illustrates a TDM transport path-cascaded echo canceler and compression arrangement in accordance with invention disclosed in the above referenced '375 application.

Before detailing the voice path capture and time stamp mechanism of the present invention, it should be observed that the invention resides primarily in a prescribed arrangement of conventional communication hardware and attendant supervisory communications microprocessor and application software therefor, that controls the operations of such hardware. In a practical implementation that facilitates its incorporation into telecommunication transceiver equipment (such as that which may be installed at a customer premises-associated integrated access device), the invention may be readily implemented using field programmable gate array (FPGA) or application-specific integrated circuit (ASIC) chip sets. In terms of a practical hardware implementation of such chip sets, digital ASICs are preferred.

Consequently, the configuration of such subsystems and components and the manner in which they may be interfaced with a telecommunication wireline pair have been illustrated in the drawings by readily understandable block diagrams, which show only those specific details pertinent to the present invention, so as not to obscure the disclosure with details that will be readily apparent to those skilled in the art having the benefit of the description herein. Thus, the block diagrams of the Figures are primarily intended to show the major components in convenient functional groupings, so that the present invention may be more readily understood.

Figure 3:
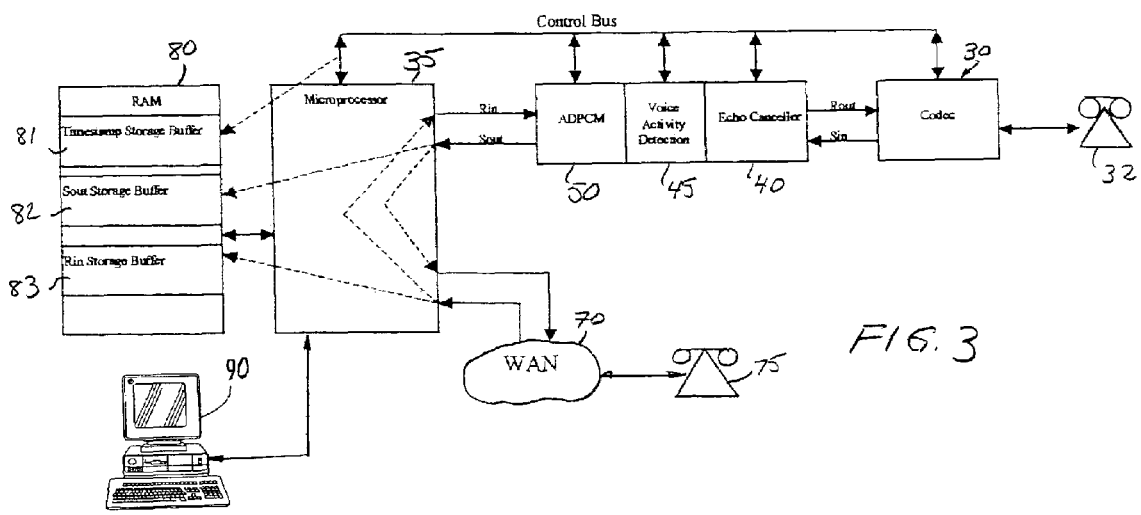
FIG. 3 diagrammatically illustrates an embodiment of the audio/voice signal capture and time stamp mechanism of the present invention incorporated into the TDM transport path-cascaded echo canceler and compression arrangement of FIG. 3.

Attention is now directed to FIG. 3, which diagrammatically illustrates an embodiment of the audio/voice signal capture and time stamp mechanism of the present invention that is incorporated into the TDM transport path-cascaded echo canceler and compression arrangement described in the above-referenced '375 application. As shown therein a voice activity detector 45 is cascaded with the respective echo cancellation and compression engines 40 and 50 in the TDM path between the codec array and the communication co-processor 35. Voice activity detector 45 operates in a customary manner to alert the processor of the presence/absence of voice traffic on the link.

In addition to being operative to assemble incoming processed voice sample data into packets in accordance with an encapsulating protocol, and then output the packetized voice signal stream over a wide area network (WAN) 70 to a destination receiver device, processor 35 is also operative, in response to a voice capture command, to store a prescribed quantity (some prespecified number (N) of seconds) of voice traffic in each of the two (upstream and downstream) transmission directions through the TDM path for a particular specified TDM channel number. The amount of voice traffic that may be stored is associated with the amount of associated random access memory RAM 80 available to the processor, and may comprise on the order of thirty seconds of voice signals.

As further shown in FIG. 3, RAM 80 is partitioned into respective storage sections associated with various types of captured information. For purposes of reducing the complexity of the drawing memory 80, three storage sections are identified as including a time stamp storage buffer 81, a downstream or send direction storage buffer 82, and an upstream or receive direction storage buffer 83. The time stamp storage buffer stores signaling events, such as but not limited to (2100 Hz) echo canceler disabler tone, voice activity detection and ADPCM rate change.

Accompanying the storage of event data (e.g., voice traffic), per se, in its respective portion of RAM, the time of occurrence of the captured data is also stored as a time stamp or tag. Storage of the time of occurrence of a captured event allows the data to be assembled and read out (e.g., displayed) as a time domain waveform for evaluation by a system troubleshooting operator. When a respective data capture buffer has been filled with the prescribed amount of data for which it is dedicated, no further data is written into that section of memory for that particular capture session.

The captured data and its associated time stamp information may then be transferred by way of a command over the controller command bus to a separate signal processing operator, such as personal computer or network workstation and the like, shown at 90, for subsequent analysis. As a non-limiting example, the captured data may be transferred in binary form via an xmodem or tftp from the IAD to the analysis station.

Once the data has been downloaded from the IAD to the waveform analysis station, it may be converted to the appropriate format (e.g., ADPCM conversion, time stamp correlation to voice data, etc.) of an associated signal processing tool, such as a graphical waveform editor. After being input to the graphical waveform editor, the data can be reproduced, for example, as by playing it out via an audio speaker, or coupled to a signal analysis application program, such as a time or frequency domain waveform analyzer. In this way, the invention operates as a 'virtual' oscilloscope, as it is able to capture pertinent data for any voice call problem along with an associated time stamp event log. This allows the user to effectively replay and analyze the captured signals of interest off line, and thus obviates the need to dispatch service personnel to the remote site containing the IAD.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

The invention claimed is:

1. For use with a processor-controlled digital communication device adapted to process digitally encoded audio signals transported over a time division multiplex (TDM) communication path for assembly in accordance with a communication protocol, so that said audio signals may be transmitted over a digital communication link to a destination device, a method comprising the steps of:
   (a) storing a prescribed quantity of said digitally encoded audio signals; and
   (b) coupling said prescribed quantity of digitally encoded audio signals to a signal waveform analysis operator, wherein said processor-controlled digital communication device is operative to perform echo cancellation and compression of said digitally encoded audio signals as received from said TDM communication path, and to couple compressed, echo cancellation-processed audio signals over said TDM communication path to a host processor of said processor-controlled digital communication device, said host processor storing said prescribed quantity of digitally encoded audio signals in accordance with step (a), and coupling said prescribed quantity of digitally encoded audio signals to said signal waveform analysis operator in accordance with step (b).

2. The method according to claim 1, wherein said echo cancellation comprises ITU G.168 echo cancellation and said compression comprises ITU G.726 adaptive differential pulse code modulation (ADPCM) compression.

3. A signal processing mechanism adapted for use with a processor-controlled digital communication device adapted to process digitally encoded audio signals transported over a time division multiplex (TDM) communication path for assembly in accordance with a communication protocol, so that said audio signals may be transmitted over a digital communication link to a destination device, said signal processing arrangement comprising:
   a memory which is operative to store a prescribed quantity of said digitally encoded audio signals; and
   a stored signal transport path which is operative to couple said prescribed quantity of digitally encoded audio signals to a signal waveform analysis operator, wherein said processor-controlled digital communication device is operative to perform echo cancellation and compression of said digitally encoded audio signals as received from said TDM communication path, and to couple compressed, echo cancellation-processed audio signals over said TDM communication path to a host processor of said processor-controlled digital communication device, said host processor being coupled with said memory storing said prescribed quantity of digitally encoded audio signals, and coupling said prescribed quantity of digitally encoded audio signals to said signal transport path for delivery to said signal waveform analysis operator.

* * * * *